US012026045B2

(12) United States Patent
Lan et al.

(10) Patent No.: US 12,026,045 B2
(45) Date of Patent: Jul. 2, 2024

(54) PROPAGATING FAULT DOMAIN TOPOLOGY TO NODES IN A DISTRIBUTED CONTAINER ORCHESTRATION SYSTEM (71) Applicant: VMware, Inc., Palo Alto, CA (US)

(72) Inventors: Jian Lan, Beijing (CN); Liang Cui, Beijing (CN); Aravind Srinivasan, Sunnyvale, CA (US); Hailing Xu, Beijing (CN); Yan Qi, Beijing (CN); Prachi Dalvi, Fremont, CA (US); Shuting Ma, Beijing (CN); Todd Sabin, Morganville, NJ (US); Uday Suresh Masurekar, Sunnyvale, CA (US); Weiqing Wu, Cupertino, CA (US)

(73) Assignee: VMware LLC, Palo Alto, CA (US)

( * ) Notice: Subject to any disclaimer, the term of this patent is extended or adjusted under 35 U.S.C. 154(b) by 118 days.

(21) Appl. No.: 17/902,350

(22) Filed: Sep. 2, 2022

(65) Prior Publication Data

US 2024/0028441 A1   Jan. 25, 2024

(30) Foreign Application Priority Data

Jul. 21, 2022   (WO) ................ PCT/CN2022/107020

(51) Int. Cl.
*G06F 11/00* (2006.01)
*G06F 9/455* (2018.01)
*G06F 11/07* (2006.01)

(52) U.S. Cl.
CPC ...... *G06F 11/0784* (2013.01); *G06F 9/45558* (2013.01); *G06F 11/0709* (2013.01); *G06F 11/0712* (2013.01); *G06F 2009/45591* (2013.01)

(58) Field of Classification Search
CPC ............ G06F 11/0709; G06F 11/0712; G06F 11/0784; G06F 9/45558; G06F 2009/45591
See application file for complete search history.

(56) References Cited

U.S. PATENT DOCUMENTS

| 10,951,479 B1* | 3/2021 | Gupta | ................. H04L 41/0893 |
| 2014/0052877 A1* | 2/2014 | Mao | .................... H04L 61/5007 709/245 |
| 2016/0380650 A1* | 12/2016 | Calder | ............. H03M 13/3746 714/766 |

(Continued)

*Primary Examiner* — Joshua P Lottich
(74) *Attorney, Agent, or Firm* — Kim & Stewart LLP (57) ABSTRACT An example method of propagating fault domain topology information in a distributed container orchestration system includes: receiving, at control plane software executing in a data center, the fault domain topology, which includes tags for a protection group and fault domains for remote sites in communication with the data center; deploying, by a master server of the distributed container orchestration system that executes in the data center, a node pool comprising virtual machines (VMs) executing in servers of the remote sites, the VMs being nodes of the distributed container orchestration system in which containers execute; determining, by a controller of the master server, relationships among the VMs, the servers, the protection group, and the fault domains based on state of resources maintained by the master server; and providing, by the controller, labels to the servers for associating the tags of the protection group and the fault domains to the VMs.

20 Claims, 4 Drawing Sheets (56) References Cited

U.S. PATENT DOCUMENTS

| | | | |
|---|---|---|---|
| 2020/0007405 A1* | 1/2020 | Chitalia | G06F 9/5072 |
| 2021/0165840 A1* | 6/2021 | Kotla | G06F 9/45558 |
| 2021/0224093 A1* | 7/2021 | Fu | G06F 9/5072 |
| 2022/0156129 A1* | 5/2022 | Li | G06F 9/5005 |
| 2022/0292008 A1* | 9/2022 | Kavali | G06F 11/0772 |
| 2023/0126045 A1* | 4/2023 | Pan | G06F 9/5022 |
| | | | 718/104 |
| 2023/0325118 A1* | 10/2023 | Hasti | G06F 3/0659 |
| | | | 711/154 |
| 2023/0325253 A1* | 10/2023 | Hasti | G06F 9/5072 |
| | | | 718/102 |
| 2023/0325254 A1* | 10/2023 | Hasti | G06F 9/5072 |
| | | | 718/102 |
| 2023/0367654 A1* | 11/2023 | Kurian | G06F 9/5083 |

* cited by examiner

PROPAGATING FAULT DOMAIN TOPOLOGY TO NODES IN A DISTRIBUTED CONTAINER ORCHESTRATION SYSTEM

CROSS-REFERENCE

This application is based upon and claims the benefit of priority from International Patent Application No. PCT/CN2022/107020, filed on Jul. 21, 2022, the entire contents of which are incorporated herein by reference.

BACKGROUND

Applications today are deployed onto a combination of virtual machines (VMs), containers, application services, and more. For deploying such applications, a container orchestrator (CO) known as Kubernetes® has gained in popularity among application developers. Kubernetes provides a platform for automating deployment, scaling, and operations of application containers across clusters of hosts. It offers flexibility in application development and offers several useful tools for scaling.

In a Kubernetes system, containers are grouped into logical unit called "pods" that execute on nodes in a cluster (also referred to as "node cluster"). Containers in the same pod share the same resources and network and maintain a degree of isolation from containers in other pods. The pods are distributed across nodes of the cluster. In a typical deployment, a node includes an operating system (OS), such as Linux®, and a container engine executing on top of the OS that supports the containers of the pod. A node can be a physical server or a VM.

In a radio access network (RAN) deployment, such as a 5G RAN deployment, cell site network functions can be realized as Kubernetes pods. Each cell site can be deployed with a single server. Containerized network functions (CNFs) execute in the servers of the cell sites. To achieve high performance, CNFs can be pinned to cell site hosts and are not migrated to other hosts. High availability can be achieved using active/standby pods or active/active pods. Fault domain topology is required for placement and distribution of pods across cell site servers, as well as ranking the best pods to which to failover/failback in case of failures. Fault domain topology information is labeled at the CO node level, e.g., at the VMs executing the CNFs. A user needs to know the physical infrastructure for these nodes and label them carefully. If a node is recreated, the user needs to manually label it again. This can be manually intensive give a large number of cell sites and can lead to errors in the fault domain topology.

SUMMARY

Embodiments include a method of propagating fault domain topology information in a distributed container orchestration system. The method includes: receiving, at control plane software executing in a data center, the fault domain topology, which includes tags for a protection group and fault domains for remote sites in communication with the data center; deploying, by a master server of the distributed container orchestration system that executes in the data center, a node pool comprising virtual machines (VMs) executing in servers of the remote sites, the VMs being nodes of the distributed container orchestration system in which containers execute; determining, by a controller of the master server, relationships among the VMs, the servers, the protection group, and the fault domains based on state of resources maintained by the master server; and providing, by the controller, labels to the servers for associating the tags of the protection group and the fault domains to the VMs.

Further embodiments include a non-transitory computer-readable storage medium comprising instructions that cause a computer system to carry out the above methods, as well as a computer system configured to carry out the above methods.

DETAILED DESCRIPTION

Figure 1:
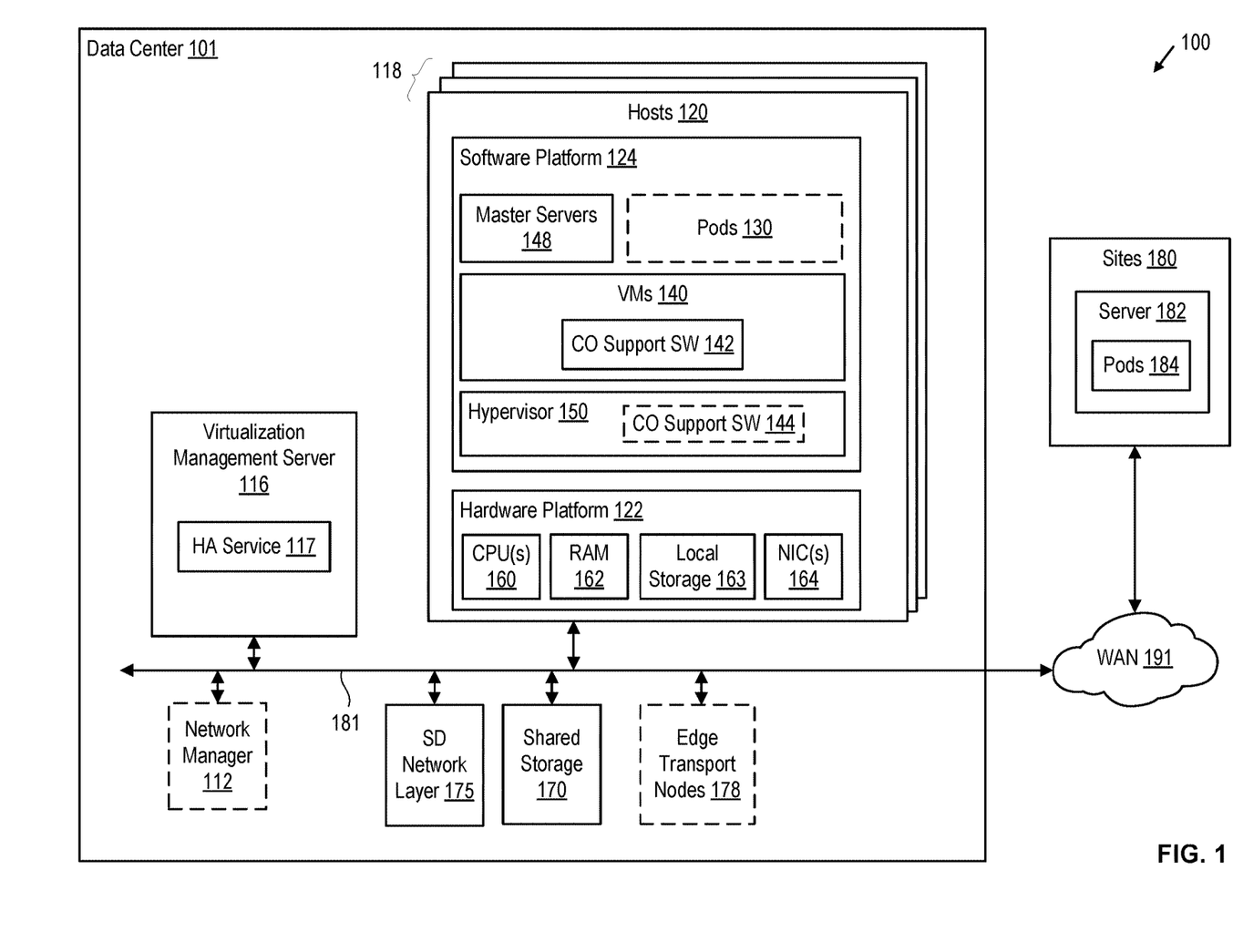
FIG. 1 is a block diagram of a virtualized computing system in which embodiments described herein may be implemented.

FIG. 1 is a block diagram of a virtualized computing system 100 in which embodiments described herein may be implemented. Virtualized computing system includes a data center 101 in communication with a plurality of sites 180 through a wide area network (WAN) 191 (e.g., the public Internet). Sites 180 can be geographical dispersed with respect to each other and with respect to data center 101. For example, sites 180 can be part of a radio access network (RAN) dispersed across a geographic region and serving different portions of such geographic region. In embodiments, data center 101 comprises a software-defined data center (SDDC) deployed in a cloud, such as a public cloud, private cloud, or multi-cloud system (e.g., a hybrid cloud system). In other embodiments, data center 101 can be deployed by itself outside of any cloud environment.

Data center 101 includes hosts 120. Hosts 120 may be constructed on hardware platforms such as an x86 architecture platforms. One or more groups of hosts 120 can be managed as clusters 118. As shown, a hardware platform 122 of each host 120 includes conventional components of a computing device, such as one or more central processing units (CPUs) 160, system memory (e.g., random access memory (RAM) 162), one or more network interface controllers (NICs) 164, and optionally local storage 163. CPUs 160 are configured to execute instructions, for example, executable instructions that perform one or more operations described herein, which may be stored in RAM 162. NICs 164 enable host 120 to communicate with other devices through a physical network 181. Physical network 181 enables communication between hosts 120 and between other components and hosts 120 (other components discussed further herein).

In the embodiment illustrated in FIG. 1, hosts 120 access shared storage 170 by using NICs 164 to connect to network 181. In another embodiment, each host 120 contains a host bus adapter (HBA) through which input/output operations (IOs) are sent to shared storage 170 over a separate network (e.g., a fibre channel (FC) network). Shared storage 170 include one or more storage arrays, such as a storage area network (SAN), network attached storage (NAS), or the like. Shared storage 170 may comprise magnetic disks, solid-state disks, flash memory, and the like as well as combinations thereof. In some embodiments, hosts 120 include local storage 163 (e.g., hard disk drives, solid-state drives, etc.). Local storage 163 in each host 120 can be aggregated and provisioned as part of a virtual SAN, which is another form of shared storage 170.

A software platform 124 of each host 120 provides a virtualization layer, referred to herein as a hypervisor 150, which directly executes on hardware platform 122. In an embodiment, there is no intervening software, such as a host operating system (OS), between hypervisor 150 and hardware platform 122. Thus, hypervisor 150 is a Type-1 hypervisor (also known as a "bare-metal" hypervisor). As a result, the virtualization layer in host cluster 118 (collectively hypervisors 150) is a bare-metal virtualization layer executing directly on host hardware platforms. Hypervisor 150 abstracts processor, memory, storage, and network resources of hardware platform 122 to provide a virtual machine execution space within which multiple virtual machines (VM) 140 may be concurrently instantiated and executed. One example of hypervisor 150 that may be configured and used in embodiments described herein is a VMware ESXi™ hypervisor provided as part of the VMware vSphere® solution made commercially available by VMware, Inc. of Palo Alto, CA.

Virtualized computing system 100 is configured with a software-defined (SD) network layer 175. SD network layer 175 includes logical network services executing on virtualized infrastructure of hosts 120. The virtualized infrastructure that supports the logical network services includes hypervisor-based components, such as resource pools, distributed switches, distributed switch port groups and uplinks, etc., as well as VM-based components, such as router control VMs, load balancer VMs, edge service VMs, etc. Logical network services include logical switches and logical routers, as well as logical firewalls, logical virtual private networks (VPNs), logical load balancers, and the like, implemented on top of the virtualized infrastructure. In embodiments, virtualized computing system 100 includes edge transport nodes 178 that provide an interface of host cluster 118 to WAN 191. Edge transport nodes 178 can include a gateway (e.g., implemented by a router) between the internal logical networking of host cluster 118 and the external network. Edge transport nodes 178 can be physical servers or VMs. Virtualized computing system 100 also includes physical network devices (e.g., physical routers/switches) as part of physical network 181, which are not explicitly shown.

Virtualization management server 116 is a physical or virtual server that manages hosts 120 and the hypervisors therein. Virtualization management server 116 installs agent(s) in hypervisor 150 to add a host 120 as a managed entity. Virtualization management server 116 can logically group hosts 120 into host cluster 118 to provide Cluster-level functions to hosts 120, such as VM migration between hosts 120 (e.g., for load balancing), distributed power management, dynamic VM placement according to affinity and anti-affinity rules, and high-availability. In embodiments, virtualization management server 116 includes high-availability (HA) service 117. HA service 117 can cooperate with hypervisors 150 in hosts 120 to provide a fault domain topology for VMs 140 to be failed over and failed back in case of failures. HA service 117 can also establish a fault domain topology for pods 184 executing in sites 180 remote from data center 101 (e.g., high-availability as a service). In other embodiments, a separate HA service can execute in data center 101 as a service on behalf of pods 184. The number of hosts 120 in host cluster 118 may be one or many. Virtualization management server 116 can manage more than one host cluster 118. While only one virtualization management server 116 is shown, virtualized computing system 100 can include multiple virtualization management servers each managing one or more host clusters.

In an embodiment, virtualized computing system 100 further includes a network manager 112. Network manager 112 is a physical or virtual server that orchestrates SD network layer 175. In an embodiment, network manager 112 comprises one or more virtual servers deployed as VMs. Network manager 112 installs additional agents in hypervisor 150 to add a host 120 as a managed entity, referred to as a transport node. One example of an SD networking platform that can be configured and used in embodiments described herein as network manager 112 and SD network layer 175 is a VMware NSX® platform made commercially available by VMware, Inc. of Palo Alto, CA, in other embodiments, SD network layer 175 is orchestrated and managed by virtualization management server 116 without the presence of network manager 112.

In embodiments, sites 180 perform software functions using containers. For example, in a RAN, sites 180 can include container network functions (CNFs) deployed as pods 184 by a container orchestrator (CO), such as Kubernetes. The CO control plane includes a master server 148 executing in host(s) 120. A master server 148 can execute in VM(s) 140 and includes various components, such as an application programming interface (API), database, controllers, and the like. A master server 148 is configured to deploy and manage pods 184 executing in sites 180. In some embodiments, a master server 148 can also deploy pods 130 on hosts 120 (e.g., in VMs 140). At least a portion of hosts 120 comprise a management cluster having master servers 148 and pods 130.

In embodiments, VMs 140 include CO support software 142 to support execution of pods 130. CO support software 142 can include, for example, a container runtime, a CO agent (e.g., kubelet), and the like. In some embodiments, hypervisor 150 can include CO support software 144. In embodiments, hypervisor 150 is integrated with a container orchestration control plane, such as a Kubernetes control plane. This integration provides a "supervisor cluster" (i.e., management cluster) that uses VMs to implement both control plane nodes and compute objects managed by the Kubernetes control plane. For example, Kubernetes pods are implemented as "pod VMs," each of which includes a kernel and container engine that supports execution of containers. The Kubernetes control plane of the supervisor cluster is extended to support VM objects in addition to pods, where the VM objects are implemented using native VMs (as opposed to pod VMs). In such case, CO support software 144 can include a CO agent that cooperates with a master server 148 to deploy pods 130 in pod VMs of VMs 140.

Figure 2:
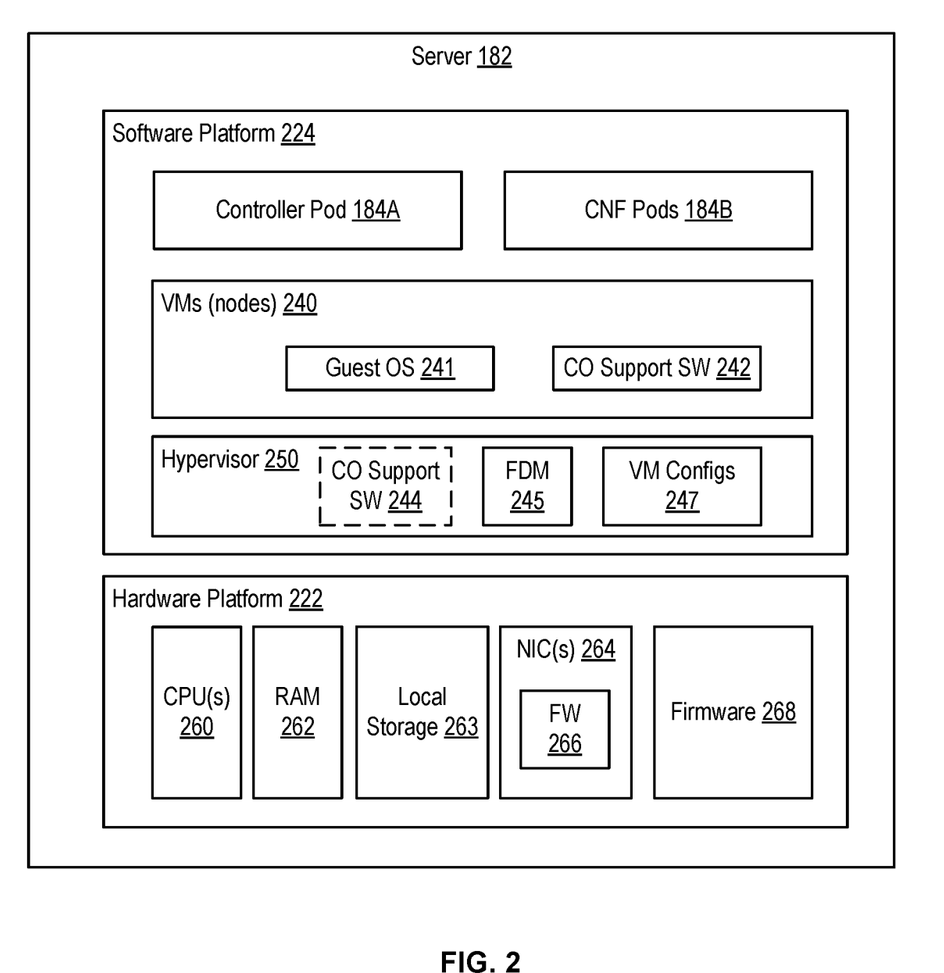
FIG. 2 is a block diagram depicting a server of a site in a distributed container orchestration system according to embodiments.

FIG. 2 is a block diagram depicting a server 182 of a site 180 according to embodiments. Server 182 may be constructed on a hardware platform such as an x86 architecture platform. As shown, a hardware platform 222 of server 182 includes conventional components of a computing device, such as one or more CPUs 260, system memory (e.g., RAM 262), one or more NICs 264, firmware 268 (e.g., basic input/output system (BIOS) or the like), and local storage 263. CPUs 260 are configured to execute instructions, for example, executable instructions that perform one or more operations described herein, which may be stored in RAM 262. NICs 264 enable server 182 to communicate with other devices (i.e., data center 101). In the example, NICs 264 have firmware 266.

A software platform 224 of server 182 includes a hypervisor 250, which directly executes on hardware platform 222. In an embodiment, there is no intervening software, such as a host OS, between hypervisor 250 and hardware platform 222. Thus, hypervisor 250 is a Type-1 hypervisor (also known as a "bare-metal" hypervisor). Hypervisor 150 supports multiple VMs 240, which may be concurrently instantiated and executed. Pods 184 execute in VMs 240. VMs 240 comprise nodes of a CO cluster. For example, pods 184B can execute network functions (e.g., containerized network functions (CNFs)). A controller pod 184A can provide overall control of CNF pods 184B. In embodiments, VMs 240 include CO support software 242 and a guest operating system (OS) 241 to support execution of pods 184. CO support software 242 can include, for example, a container runtime, a CO agent (e.g., kubelet), and the like. Guest OS 241 can be any commercial operating system (e.g., Linux®. In some embodiments, hypervisor 250 can include CO support software 244 that functions as described above with hypervisor 150. Hypervisor 250 can include a fault domain manager (FDM) 245, which cooperates with an HA service in data center 101 to provide high-availability for pods 184. Hypervisor 250 includes configuration files ("VM configs 247") describing VMs 240 (e.g., configuration of CPU, memory, storage for VMs, and the like).

Figure 3:
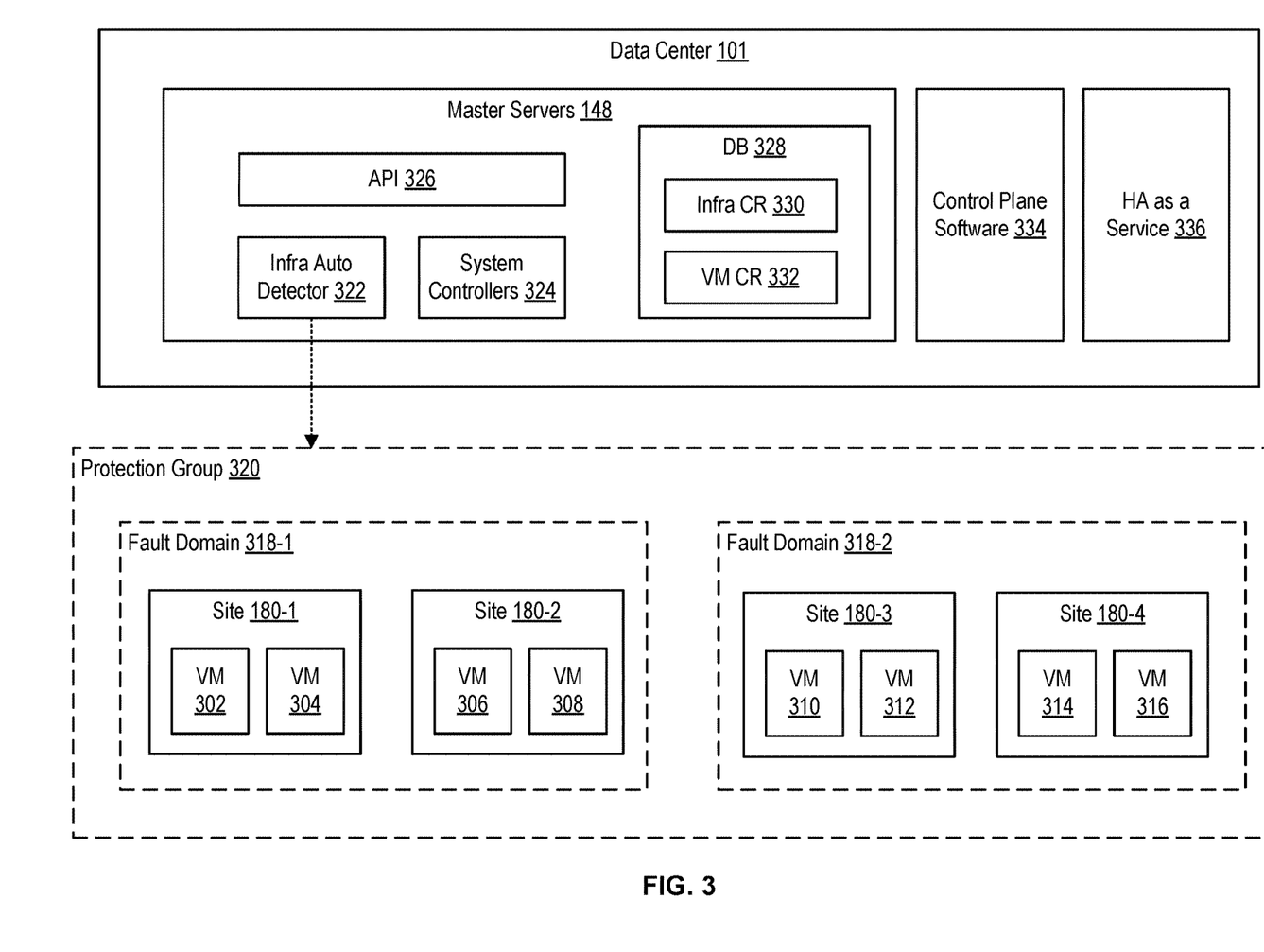
FIG. 3 is a block diagram depicting state of virtualized computing system during propagation of fault domain topology information according to embodiments.

FIG. 3 is a block diagram depicting state of virtualized computing system during propagation of fault domain topology information according to embodiments. Data center 101 includes control plane software 334 and an HA as a service 336 executing therein. A user interacts with control plane software 334 to generate a fault domain topology and to deploy nodes executing CNFs across sites 180. In embodiments, CNFs are not migrated among servers 181 of sites 180, but rather are pinned to servers 181 to achieve high performance, e.g., using CPU pinning, non-uniform memory access (NUMA) awareness, memory optimization, peripheral component interface (PCI) passthrough, and the like. High availability is achieved using active/standby, active/active, or the like configurations. For example, in an active/standby configuration, in case of pod failure, a standby pod can be made active. HA as a service 336 is the arbiter for failover and failback for active/standby configurations. In case of active/active configurations, HA as a service 336 can detect loss of redundancy and grow the node cluster to restore redundancy. Regardless of HA configuration, nodes require fault domain topology details for placement and distribution of pods and choosing the best pods for failover and failback.

Figure 4:
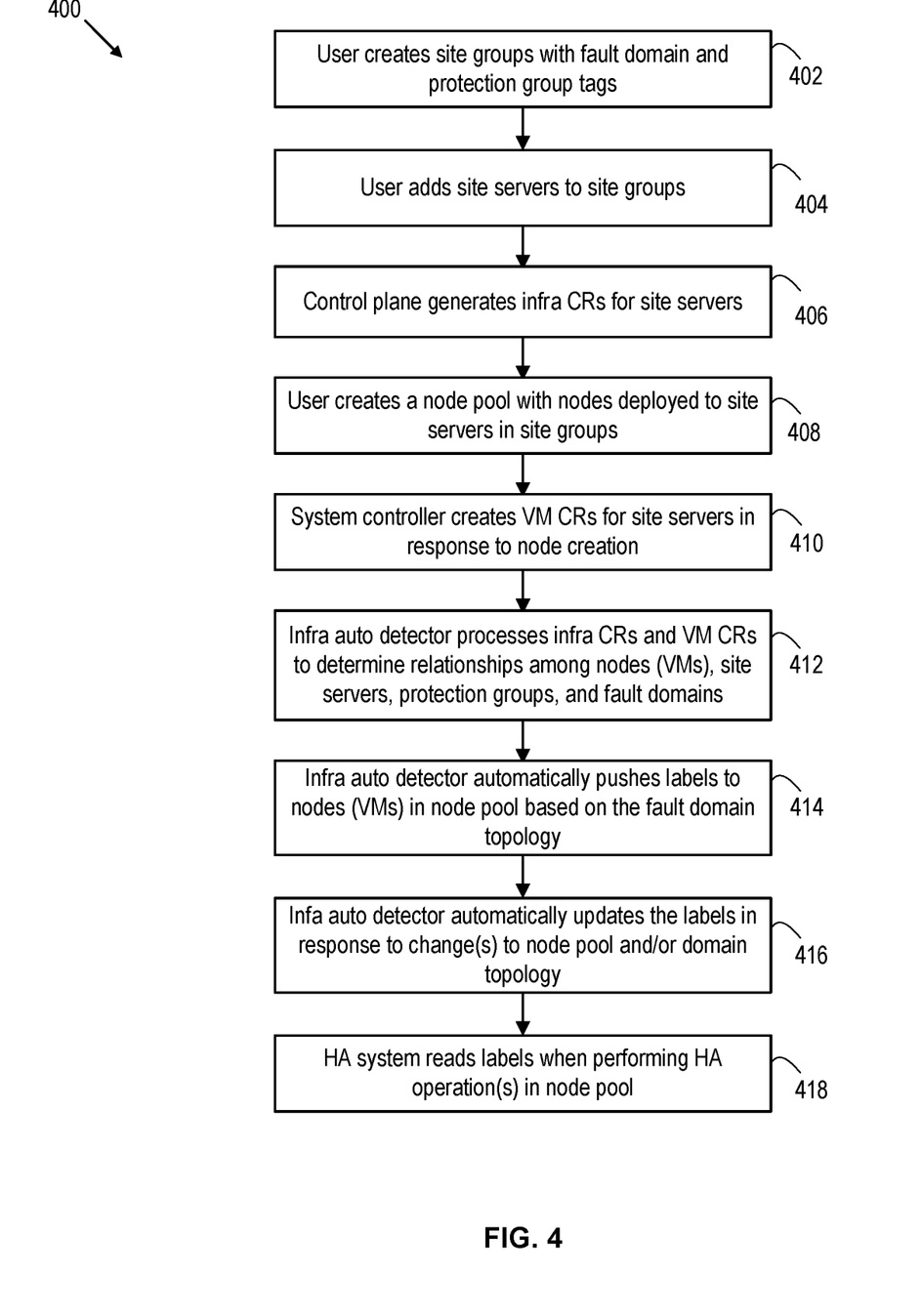
FIG. 4 is a flow diagram depicting a method of propagating fault domain topology information to nodes of a distributed CO cluster according to embodiments.

FIG. 4 is a flow diagram depicting a method 400 of propagating fault domain topology information to nodes of a distributed CO cluster according to embodiments. Method 400 begins at step 402, where a user interacts with control plane software 334 to generate a fault domain topology that includes site groups with fault domain and protection group tags. A protection group is a group of sites protected by HA as a service 336. A user can create multiple protection groups within sites 180. In FIG. 3, for example, a protection group 320 includes sites 180-1 through 180-4. A user can create a plurality of fault domains within each protection group. A pod can include multiple instances depending on the HA protection scheme. Pod instances can be distributed across fault domains, e.g., an active pod instance in one fault domain and a standby pod instance in another fault domain. In FIG. 3, for example, protection group 320 includes fault domains 318-1 and 318-2. Fault domain 318-1 includes sites 180-1 and 180-2. Fault domain 318-2 includes sites 180-3 and 180-4. Protection groups and fault domains are achieved using tags applied to nodes (VMs) of the cluster. For example, protection group 320 can be tagged as "group 1." Fault domain 318-1 can be tagged as "domain 1." Fault domain 318-2 can be tagged as "domain 2."

At step 404, a user adds servers 181 of sites 180 to site groups. In the example of FIG. 3, the user adds servers 181 of sites 180-1 through 180-4 to protection group 320. In response, at step 406, control plane software 334 generates infra custom resources (CRs) 330. That is, when a user adds a server 182 of a site 180 to a protection group, control plane software 334 interacts with a master service 148 through its application programming interface (API) 326 to create an infra CR 330. API 326 stores infra CRs 330 in a database (DB) 328. For example, API 326 can be a Kubernetes API server. Custom resources are extensions of the Kubernetes API. An infra CR 330 describes a server 182 of a site 180 including the protection group and fault domain tags applied thereto. For example, when the user adds server 182 of site 180-1 to fault domain 318-1 of protection group 320, an infra CR 330 includes the identity of the server, a protection group tag of "group 1, and a fault domain tag of domain 1." When the user adds server 182 of site 180-3 to fault domain 318-2 of protection group 320, an infra CR includes the identity of the server, the protection group tag "group 1," and a fault domain tag of "domain 2." In general, infra CRs 330 relate protection group and fault domain tags to servers 181 of sites 180 and are generated automatically by control plane software 334 as the user sites 180 and corresponding servers 181 to protection groups and fault domains.

At step 408, a user creates a node pool with nodes deployed to site servers in site groups. A node pool is a group of nodes, e.g., VMs, in which pods execute. In the example of FIG. 3, the node pool includes VMs 302, 304, 306, 308, 310, 312, 314, and 316. VMs 302 and 304 are deployed to site 180-1. VMs 306 and 308 are deployed to site 180-2. VMs 310 and 312 are deployed to site 180-3. VMs 314 and 316 are deployed to site 180-4. The user can interact with control plane software 334, which in turn interacts with master server 148 through API 326 to deploy the nodes in the node pool. Alternatively, the user can interact directly with master server 148.

Master servers 148 include controllers configured to monitor state of resources stored in DB 328 by API 326 and to make changes to such state. Each controller tracks at least one resource type. In embodiments, master servers 148 include an infra auto detector controller ("infra auto detector 322") and system controllers 324. DB 328 can store resources representing nodes and pods (not shown) and master servers 148 can include system controllers 324 to track such resources. In embodiments, when a node is created, a system controller 324 creates a VM CR 332 for the node (step 410). VM CR 332 includes information describing the VM that is functioning as the node. For example, a VM CR 332 can include information such as the name of the VM, datastores attached to the VM, capacities of resources assigned to the VM (e.g., memory, storage, CPU), devices attached to the VM (e.g., network devices), which server in which the VM is deployed, and the like. Thus, at step 410, when VMs 302 through 316 are deployed, VM CRs 332 are automatically created.

At step 412, infra auto detector 322 processes infra CRs 330 and VM CRs 332 to determine relationships between nodes (VMs), site servers, protection groups, and fault domains. Infra auto detector 322 comprises a controller that tracks infra CRs 330 and VM CRs 332. Infra auto detector 322 can determine relationships between VMs (nodes) and servers from VM CRs 332. Thus, infra auto detector 322 determines that VMs 302 and 304 execute in server 182 of site 180-1. Infra auto detector 322 can determine relationships between servers, protection groups, and fault domains from infra CRs 330. Thus, infra auto detector 322 determines that the servers of sites 180-1 and 180-2 are in fault domain 318-1 ("domain 1") of protection group 320 ("group 1"). Infra auto detector 322 can then relate nodes (VMs) to protection group and fault domain tags. Thus, infra auto detector determines that VMs 302, 304, 306, and 308 are in fault domain 318-1 ("domain 1") of protection group 320 ("group 1") and that VMs 310, 312, 314, and 316 are in fault domain 318-2 ("domain 2") of protection group 320 ("group 1"). In this manner, infra auto detector 322 automatically determines the fault domain topology created by the user and how the corresponding protection group and fault domain tags need to be applied to the nodes (VMs).

At step 414 infra auto detector 322 automatically pushes labels to nodes (VMs) in the node pool based on the determined fault domain topology. For example, VMs 302, 304, 306, and 308 are labeled with "group 1" and "domain 1," whereas VMs 310, 312, 314, and 316 are labeled with "group 1" and "domain 2." Infra auto detector 322 can add the labels to VM configs 247 such that the protection group and fault domain tags become properties of the VMs. During HA operations, FDM 245 can identify a protection group and a fault domain for a VM from a VM config 247 (step 418). Infra auto detector 322 automatically provides the fault domain topology to sites 180 so that HA operations function correctly without the need for manual tagging by the user. If the state of the fault domain topology and/or node pool changes, infra CRs 330 and/or VM CRs 332 will be updated or newly created. Infra auto detector 322 tracks modification and creation of infra CRs 330 and VM CRs 332 and pushes modifications of the fault domain topology to sites 180. The user is not required to manually update protection group and fault domain tags when making changes to state of the cluster (step 416).

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of propagating a fault domain topology in a distributed container orchestration system, comprising:
receiving, at control plane software executing in a data center, the fault domain topology, which includes tags for a protection group and fault domains for remote sites in communication with the data center;
deploying, by a master server of the distributed container orchestration system that executes in the data center, a node pool comprising virtual machines (VMs) executing in servers of the remote sites, the VMs being nodes of the distributed container orchestration system in which containers execute;
determining, by a controller of the master server, relationships among the VMs, the servers, the protection group, and the fault domains based on state of resources maintained by the master server; and
providing, by the controller, labels to the servers for associating the tags of the protection group and the fault domains to the VMs.

2. The method of claim 1, wherein the resources maintained by the master server include first resources that relate the tags of the protection group and the fault domains to the servers of the remote sites, and second resources that relate the VMs to the servers in which the VMs execute.

3. The method of claim 2, wherein the control plane software interacts with the master server to create the first resources in response to creation of the fault domain topology.

4. The method of claim 2, wherein a system controller of the master server creates the second resources in response to deployment of the node pool.

5. The method of claim 1, further comprising:
updating, by the controller, the labels in response to a change in the state of the resources maintained by the master server.

6. The method of claim 1, wherein the labels are added to configuration files for the VMs.

7. The method of claim 1, wherein a high availability (HA) system is configured to read the labels when performing an HA operation in the node pool.

8. A non-transitory computer readable medium comprising instructions to be executed in a computing device to cause the computing device to carry out a method of propagating a fault domain topology in a distributed container orchestration system, comprising:
receiving, at control plane software executing in a data center, the fault domain topology, which includes tags for a protection group and fault domains for remote sites in communication with the data center;
deploying, by a master server of the distributed container orchestration system that executes in the data center, a node pool comprising virtual machines (VMs) executing in servers of the remote sites, the VMs being nodes of the distributed container orchestration system in which containers execute;
determining, by a controller of the master server, relationships among the VMs, the servers, the protection group, and the fault domains based on state of resources maintained by the master server; and
providing, by the controller, labels to the servers for associating the tags of the protection group and the fault domains to the VMs.

9. The non-transitory computer readable medium of claim 8, wherein the resources maintained by the master server include first resources that relate the tags of the protection group and the fault domains to the servers of the remote sites, and second resources that relate the VMs to the servers in which the VMs execute.

10. The non-transitory computer readable medium of claim 9, wherein the control plane software interacts with the master server to create the first resources in response to creation of the fault domain topology.

11. The non-transitory computer readable medium of claim 9, wherein a system controller of the master server creates the second resources in response to deployment of the node pool.

12. The non-transitory computer readable medium of claim 8, further comprising:
updating, by the controller, the labels in response to a change in the state of the resources maintained by the master server.

13. The non-transitory computer readable medium of claim 8, wherein the labels are added to configuration files for the VMs.

14. The non-transitory computer readable medium of claim 8, wherein a high availability (HA) system is configured to read the labels when performing an HA operation in the node pool.

15. A virtualized computing system, comprising:
a data center in communication with remote sites over a network forming a distributed container orchestration system; and
software executing in the data center, the software configured to:
receive, at control plane software executing in the data center, a fault domain topology, which includes tags for a protection group and fault domains for the remote sites;
deploy, by a master server of the distributed container orchestration system that executes in the data center, a node pool comprising virtual machines (VMs) executing in servers of the remote sites, the VMs being nodes of the distributed container orchestration system in which containers execute;
determine, by a controller of the master server, relationships among the VMs, the servers, the protection group, and the fault domains based on state of resources maintained by the master server; and
provide, by the controller, labels to the servers for associating the tags of the protection group and the fault domains to the VMs.

16. The virtualized computing system of claim 15, wherein the resources maintained by the master server include first resources that relate the tags of the protection group and the fault domains to the servers of the remote sites, and second resources that relate the VMs to the servers in which the VMs execute.

17. The virtualized computing system of claim 16, wherein the control plane software interacts with the master server to create the first resources in response to creation of the fault domain topology.

18. The virtualized computing system of claim 16, wherein a system controller of the master server creates the second resources in response to deployment of the node pool.

19. The virtualized computing system of claim 15, wherein the labels are added to configuration files for the VMs.

20. The virtualized computing system of claim 15, wherein a high availability (HA) system is configured to read the labels when performing an HA operation in the node pool.

* * * * *